United States Patent [19]

Moshtev et al.

[11] 4,234,623
[45] Nov. 18, 1980

[54] METHOD FOR THE PRODUCTION OF MEMBRANE BATTERY SEPARATORS

[75] Inventors: Rafail V. Moshtev; Hrisanta N. Budevska; Latinka T. Ivanova; Radka D. Yankova, all of Sofia, Bulgaria

[73] Assignee: ZLEHIT pri BAN, Sofia, Bulgaria

[21] Appl. No.: 937,998

[22] Filed: Aug. 30, 1978

[51] Int. Cl.³ .......................... B05D 3/06; H01M 2/16
[52] U.S. Cl. ...................................... 427/54.1; 427/58; 427/301; 427/322; 427/370; 429/249
[58] Field of Search ................. 156/272, 313; 427/54, 427/58, 370, 301, 322, 54.1, 400; 8/DIG. 18, DIG. 12; 429/249, 253; 204/159.15, 159.2

[56] References Cited

U.S. PATENT DOCUMENTS

| | | | |
|---|---|---|---|
| 2,956,899 | 10/1960 | Cline | 8/DIG. 18 |
| 3,088,791 | 5/1963 | Cline et al. | 427/36 |
| 3,322,661 | 5/1967 | Yoshikawa et al. | 204/159.17 |
| 3,427,206 | 2/1969 | Scardaville et al. | 427/115 X |
| 3,687,878 | 8/1972 | Imoto et al. | 8/DIG. 18 X |
| 3,955,014 | 5/1976 | Mostev et al. | 427/54 |

Primary Examiner—Michael G. Wityshyn

[57] ABSTRACT

An improved method for manufacturing membrane battery separators by grafting a vinyl monomer onto a polyolefin film. The method includes irradiation of the film by ultraviolet rays and subsequent grafting of the said film in a five-layer sandwich. The sandwich comprises the irradiated polyolefin film which is covered on each side with a layer of a cellulosic tissue soaked with the monomer or a solution of the monomer, and each cellulosic layer on its turn is covered by an inert polymeric film. The layers of the sandwich are not limited in length and the sandwich is transported at a constant speed over the surface of a heater, maintaining the sandwich at a constant temperature in the range 85° to 95° C. with an accuracy of ±1° C. The grafting of the polyolefin film in the sandwich proceeds continuously and isothermally, while it is in contact with the heater surface under a pressure of 10 to 30 g/cm² during 10 to 45 minutes.

9 Claims, No Drawings

METHOD FOR THE PRODUCTION OF MEMBRANE BATTERY SEPARATORS

This invention relates to a method for the production of membrane separators for alkali accumulator batteries.

A method for the production of membrane separators is known (U.S. Pat. No. 3,427,206), according to which a gamma-ray irradiated polyethylene film is wound-up together with cellulose cloth in a multi-layer spool, and is then immersed into a vessel containing a monomer, which is grafted to the polyethylene under the action of gamma-irradiation for a period of 70 to 130 hours.

The drawbacks of this method are its rather low rate, the non-uniform grafting along the length of the film, the impossibility to carry it out under production-line conditions, as well as the necessity of using expensive and dangerous gamma-ray sources.

An attempt to improve this method is disclosed in West German Pat. No. 2,144,253 (Mar. 16, 1972). According to such patent, the process of grafting is effected in a pack comprising ten layers of polymer material, such layers being separated by glass partitions. The grafting monomer is applied in advance to the polymer material, the pack is closed, and is then subjectd to irradiation with X- or gamma-rays in a medium of inert gas or a vacuum. Except for the possibility of better temperature control in a thinner layer, this method has all the drawbacks of the other previous method.

According to another method for the production of membrane separators for alkali batteries (U.S. Pat. No. 3,955,014), the polyethylene film, which is irradiated with ultraviolet light, is wound-up together with cellulose cloth or paper in a multi-layer spool, which is then impregnated with methacrylic acid which is grafted to the polyethylene film by heating the spool at 70° to 90° C. for 60 to 90 minutes. The drawbacks of this method lie in the difficulties of dissipating the reaction heat, the non-uniform grafting along the length of the film, as well as in the interrupted character of the process.

According to an East German Patent (DDR No. 89,244, Apr. 12, 1972), the winding-up of a spool is avoided, and the grafting is effected on a layer of polymer film impregnated with the monomer, the layer being placed in a pack between two surfaces of thin cellulose material and enclosed between two metal surfaces. The polymer foil, which is grafted in advance, is processed in a solution of an initiator (peroxides or azo-compounds). The attained degree of grafting after heating for 8 to 10 hours at 70° C. does not exceed 30%. The use of an initiator appears as a drawback of the method, while the low degree of grafting makes it inapplicable for the production of grafted membranes of high ionic conductance.

For the correct operation of an alkali battery, the resistance of the membrane separators in 40% potassium hydroxide at 22° C. must be from 0.06 to 0.15 ohm.cm$^2$, depending on the purpose of the battery, and the deviations from the average value of the resistance must not exceed ±30%. This requires the development of a method which avoids all aforementioned drawbacks.

It is, therefore, a general object of the present invention to provide a method for the production of membrane separators which insure a high degree of grafting (over 80%) of the polyethylene film, as well as a great uniformity along the length and width of the film.

The gist of the invention lies in the grafing of a vinyl monomer to a polyolefin film, activated by ultraviolet irradiation, the grafting being effected in a five-layer sandwich, comprising an activiated polyolefin film, covered on both sides by cellulose material impregnated with the monomer or its solution and pressed from each side by an inert polymer band enclosing the reaction space. The cellulose material used as a carrier of the monomer is bleached non-finished tissue of natural cotton, such as cheese-cloth, with a thickness of 150 to 200 microns and a density of about 10 fibers per centimeter. The material of the inert polymeric foil is biaxially oriented polyester film 80 to 150 microns thick. The layers of the sandwich are not limited in length and the sandwich is transported at a constant speed from 1 to 100 m/hour over the surface of a heater, maintaining the sandwich at a constant temperature in the range 85° to 95° C. with an accuracy ±1° C. The grafting of the polyolefin film in the sandwich proceeds continuously and isothermally while it is in contact with the heater surface under a pressure of 10 to 30 g/cm$^2$ during 10 to 45 minutes.

The basic advantages of this method are that the grafting proceeds isothermally and, as a result, the produced separator film is characterized by a high uniformity of its properties, as well as by the possibility for continuous production-line use of the process and its total automation. Moreover, conditions are provided to reduce to a minimum production wastes and monomer consumption, to diminish the amount of effluents and pollutants, which must be neutralized and deactivated, as well as to secure operational safety and sanitation.

For a better understanding of the invention, reference is now made to several examples, which are intended to explain it rather than to limit its scope.

EXAMPLE I

The low-density polyethylene film, activated by ultraviolet irradiation, with a density of about 0.925 g/cm$^2$, a melt index of about 2 g/10 min and a thickness of about 35 microns, is covered on both sides with well-dried paper of bleached cellulose with a weight of about 20 g/m$^2$ and a density of about 0.8 g/cm$^3$, which does not contain any impregnators, fillers, pigments or other admixtures. Each of both paper layers is impregnated with about 0.3 to 0.5 lit/m$^2$ distilled methacrylic acid, containing less than 5 micrograms per liter inhibitor, and then each paper layer is covered by a polyester film with a thickness of 80 to 150 microns. The obtained five-layer sandwich is tightly pressed against a heater, heated to 88°±1° C. with a pressure of 10 to 20 g/cm$^2$ for 25 minutes for the accomplishment of the polymerization process. The grafted polyethylene film is alkalized in 5 to 10% potassium hydroxide at 60° to 70° C. for 20 to 30 minutes. The ionic resistance of the thus produced membrane separator in 40% potassium hydroxide at 22° C. is less than 0.12 ohms.cm$^2$; the degree of grafting determined by the increase of the film weight is higher than 80%, while the tensile strength of the dry film is higher than 150 kg/cm$^2$.

EXAMPLE II

The five-layer sandwich not limited in length, prepared in accordance with Example I, is passed under pressure over one or more heating surfaces (flat or rounded), heated to 88°±1° C. with such a velocity as to insure a firm contact with the heating surface for about 20 minutes. After the alkalization, the produced membrane separator has the properties described in Example I.

EXAMPLE III

The grafting is effected in accordance with Examples I or II, with the difference that the heating time is 15 to 18 minutes. The resistance of the membrane separator after its alkalization is from 0.20 to 0.25 ohms.cm$^2$, the degree of grafting is about 70%, while the tensile strength of the product film is higher than 180 kg/cm$^2$.

EXAMPLE IV

The grafting is effected in accordance with Examples I or II; however with the difference that the temperature of the heater is 85°±1° C., while the heating time of the sandwich is 35 to 40 minutes. The properties of the grafted film after its alkalization are as indicated in Example I; however, the tensile strength of the product film reaches about 220 kg/cm$^2$.

EXAMPLE V

The grafting is effected in accordance with Examples I to IV; however with the difference that instead of paper there is used non-finished cloth from natural bleached cotton, such as cheese-cloth, with a thickness of 150 to 200 microns and a density of 8 to 10 fibers per cm. The produced membrane separator is featured by characteristics corresponding to those indicated in Example I to IV, inclusively.

EXAMPLE VI

The grafting is effected in accordance with Examples I, II or V; however, instead of 100% distilled methacrylic acid there is used its 70–80% solution in toluene or xylene. The produced membrane separator has the characteristics indicated in Example I.

EXAMPLE VII

The grafting is effected in accordance with Examples I, II or V; however, instead of 100% distilled methacrylic acid there is used its 85–95% solution in tetrachloromethane. The produced membrane separator has the characteristics indicated in Example I.

EXAMPLE VIII

The grafting is effected in accordance with Examples I, II, V, VI or VII; however, there is the difference that the thickness of the polyethylene film is 80 microns instead of 35 microns, the number of cloth or paper layers on each side of the polyethylene film is two instead of one, the quantity of methacrylic acid or its solutions is from 0.5 to 0.9 lit/m$^2$, while the heating time of the sandwich is about 45 minutes. The resistance of the produced membrane separator is about 0.3 ohms.cm$^2$.

Although the invention is illustrated and described with reference to a pluraity of preferred embodiments thereof, it is to be expressly understood that it is in no way limited to the disclosure of such a plurality of preferred embodiments, but is capable of numerous modifications within the scope of the appended claims.

What is claimed is:

1. In a method for the production of a battery separator film made of a polyolefin film which has been irradiated by ultraviolet rays to which a vinyl monomer has been grafted, the improvement which includes the accomplishment of the grafting in a five-layer sandwich comprising forming a three-layer sandwich made up of the polyolefin film and a cellulose tissue on each side of the polyolefin film, the tissue layers being impregnated with the monomer or its solution, the three-layer sandwich being pressed on each side by a polymer foil which confines the reaction space, said polymer foil being inert, contacting the resulting five-layer sandwich for 10 to 45 minutes against a heater with a pressure of 10 to 30 g/cm$^2$, the layers of the five-layer sandwhich being of unlimited length, the five-layer sandwich being transported over the surface of the heater at a speed of from 1–100 m/hour.

2. A method according to claim 1, wherein the cellulose tissue is bleached non-finished tissue of natural cotton, such as cheese-cloth, with a thickness of 150 to 200 microns and a density of about 10 fibers per centimeter.

3. A method according to claim 1, wherein the inert polymer foil is a biaxially oriented polyester film with a thickness of 80 to 150 microns.

4. A method according to claim 1 wherein the temperature at the surface of the heater is maintained constant in the range from 85° to 95° C. with an accuracy of ±1° C.

5. A method according to claim 1, wherein the cellulose tissues of the five-layer sandwich are bleached layers of paper.

6. A method according to claim 1, wherein the cellulose tissues of the five-layer sandwich are bleached layers of cheese cloth.

7. A method according to claim 1, wherein the monomer employed is methacrylic acid.

8. A method according to claim 1, wherein the solution with which the tissue layers are impregnated is a solution of methacrylic acid in an aromatic solvent.

9. A method according to claim 8, wherein the aromatic solvent is selected from the group consisting of toluene and xylene.

* * * * *